United States Patent
Vulliet

(10) Patent No.: US 10,403,921 B2
(45) Date of Patent: Sep. 3, 2019

(54) ELECTRICITY GENERATING ELECTROCHEMICAL DEVICE OF THE SOLID-OXIDE FUEL-CELL STACK TYPE

(71) Applicant: COMMISSARIAT A L'ENERGIE ATOMIQUE ET AUX ENERGIES ALTERNATIVES, Paris (FR)

(72) Inventor: Julien Vulliet, Joue-les-Tours (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/535,241

(22) PCT Filed: Dec. 15, 2015

(86) PCT No.: PCT/EP2015/079704
§ 371 (c)(1),
(2) Date: Jun. 12, 2017

(87) PCT Pub. No.: WO2016/096793
PCT Pub. Date: Jun. 23, 2016

(65) Prior Publication Data
US 2017/0365873 A1    Dec. 21, 2017

(30) Foreign Application Priority Data
Dec. 17, 2014   (FR) ...................... 14 62578

(51) Int. Cl.
*H01M 8/248* (2016.01)
*H01M 8/0236* (2016.01)
*H01M 8/0232* (2016.01)
*H01M 8/0258* (2016.01)
(Continued)

(52) U.S. Cl.
CPC ......... *H01M 8/248* (2013.01); *H01M 8/0232* (2013.01); *H01M 8/0236* (2013.01);
(Continued)

(58) Field of Classification Search
CPC combination set(s) only.
See application file for complete search history.

(56) References Cited

U.S. PATENT DOCUMENTS

2007/0269702 A1* 11/2007 Nakajima ........... H01M 8/0276
429/442
2008/0286630 A1    11/2008 Jacobson et al.
(Continued)

FOREIGN PATENT DOCUMENTS

EP    2 903 071 A1    8/2015

OTHER PUBLICATIONS

International Search Report dated Feb. 18, 2016 in PCT/EP2015/079704 filed Dec. 15, 2015.
(Continued)

*Primary Examiner* — Christopher P Domone
(74) *Attorney, Agent, or Firm* — Oblon, McClelland, Maier & Neustadt, L.L.P.

(57) ABSTRACT

The invention relates to an electricity generating electrochemical device of the solid-oxide fuel-cell stack type. The device includes a planar assembly having at least one electrochemical cell comprised between first and second gas diffusing plates made of ceramic of expansion coefficient between $8 \times 10^{-6}$ K$^{-1}$ and $10 \times 10^{-6}$ K$^{-1}$ and drilled with equidistant holes. First and second current conductive metal grids each are connected to a conductive wire allowing current to flow out of the device. The grilles are placed on either side of the at least one electrochemical cell between this cell and each of the first and second gas diffusing plates. A clamping device mechanically holds the planar assembly together.

12 Claims, 2 Drawing Sheets

(51) Int. Cl.
  *H01M 8/12* (2016.01)
  *H01M 8/2425* (2016.01)
  *H01M 8/124* (2016.01)

(52) U.S. Cl.
  CPC ........... *H01M 8/0258* (2013.01); *H01M 8/12* (2013.01); *H01M 8/2425* (2013.01); *H01M 2008/1293* (2013.01); *H01M 2250/30* (2013.01); *Y02B 90/18* (2013.01)

(56) References Cited

U.S. PATENT DOCUMENTS

| | | | |
|---|---|---|---|
| 2009/0092877 A1 | 4/2009 | Yoshikata | |
| 2009/0317686 A1* | 12/2009 | Huston | H01M 8/0236 429/432 |
| 2012/0009497 A1 | 1/2012 | Jacobson et al. | |
| 2013/0071770 A1* | 3/2013 | Takata | C04B 35/47 429/468 |
| 2013/0260280 A1* | 10/2013 | Hiraiwa | B01D 53/32 429/482 |
| 2013/0320583 A1* | 12/2013 | Mitchell | H01M 8/0243 264/105 |
| 2015/0200415 A1 | 7/2015 | Nakai | |

OTHER PUBLICATIONS

French Preliminary Search Report dated Aug. 7, 2015 in French Patent Application No. 1462578 filed Dec. 17, 2014.

K. Föger, et al., "Fifteen years of SOFC development in Australia", Solid State Ionics, vol. 174, 2004, pp. 119-126.

Carlos Boigues-Muñoz, et al., "Thermochemical model and experimental validation of a tubular SOFC cell comprised in a 1 $kW_{el}$ stack designed for μCHP applications", International Journal of Hydrogen Energy, vol. 39, 2014, pp. 21714-21723.

A. Dhir, et al., "Microtubular SOFC anode optimisation for direct use on methane", Journal of Power Sources, vol. 181, 2008, pp. 297-303.

Iain Staffell, et al., "The cost of domestic fuel cell micro-CHP systems", International Journal of Hydrogen Energy, vol. 38, 2013, pp. 1088-1102.

Luwei Chen, et al., "Hydrogen production by coupled catalytic partial oxidation and steam methane reforming at elevated pressure and temperature", Journal of Power Sources, vol. 164, 2007, pp. 803-808.

* cited by examiner

ELECTRICITY GENERATING ELECTROCHEMICAL DEVICE OF THE SOLID-OXIDE FUEL-CELL STACK TYPE

TECHNICAL DOMAIN

The invention relates to an electrochemical electricity generating device of the solid-oxide fuel-cell type. Such a device may for example be used as a demonstrator of the high temperature "Solid Oxide Fuel Cell" (SOFC) technology or as a makeup electricity generator to recharge a battery, for example for a laptop, or to supply one or several small electrical devices.

State of Prior Art

The domain of the invention is solid oxide fuel cells that operate at very high temperatures, typically between 450° C. and 1000° C., with an output power varying from 50 W to several MW.

A fuel cell is a generator that directly converts reversible chemical energy of a reaction (in fact the free enthalpy of the reaction $\Delta G$) into electrical energy. The fuel cell uses a fuel (hydrogen, methanol, natural gas, etc.) and an oxidant (oxygen from the air) without mixing them, and dissociates the chemical reaction into two electrochemical reactions, oxidation of the fuel (at the anode) and reduction of the oxidant (at the cathode). For example in an SOFC type cell, two hydrogen molecules are associated with one oxygen molecule to form two water molecules and to generate electricity.

The elementary cell of a stack is composed of two compartments, anodic and cathodic, separated by an ion conductor, the electrolyte, and connected through an external electronic conducting circuit. The electrolyte separates the reagents, prevents electrons from passing through the core of the stack, and enables the migration of ion species from one electrode to the other under the effect of the electric field created by the difference in oxygen concentration in the two compartments.

There are several types of fuel cells, differentiated essentially by the nature of the electrolyte used and the working temperature.

The reagents are renewed and the products are evacuated continuously. The fuel cell as a whole is an assembly of elementary cells connected to each other by interconnection materials, in a sufficiently large number for the electrochemical production of electricity to satisfy the required voltage and current conditions.

The theoretical efficiencies obtained (up to 85-90% global efficiency) are much higher than efficiencies that can be obtained by classical combustion (of the order of 30%), and polluting emissions are strongly reduced, and may even be zero if the fuel is hydrogen (water releases only). The relatively easy recovery of heat also makes it possible to envisage cogeneration (electricity+heat).

According to the ideal operating principle of a fuel cell, hydrogen that acts as the fuel is added at the anode and oxygen that acts as oxidant is added at the cathode. The oxygen used is usually oxygen in air for convenience reasons, and attempts are being made to replace hydrogen by natural gas (composed mainly of methane, $CH_4$, and alcohols (such as ethanol $C_2H_5OH$) and liquid hydrocarbons (Liquefied Petroleum Gas-LPG), composed principally of propane $C_3H_8$), due to problems with the storage and distribution of hydrogen as a fuel. However, direct electrochemical oxidation of these fuels into $H_2$ is a necessary prerequisite to the electrochemical oxidation of hydrogen. In particular, steam reforming and partial oxidation can be used. The fuel can be converted outside the core of the stack, or in some cases even inside the core of the stack, as for steam reforming of methane; this is then internal reforming of the fuel. One of the advantages of SOFC type cells, for which the operating temperature is high, is that this internal reforming is possible.

Natural gas is composed essentially of methane. There are three reactions for producing hydrogen from methane:

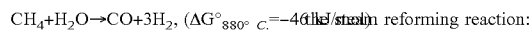

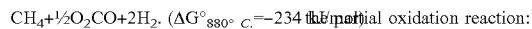

Complete oxidation (combustion) of methane can also occur:

Details of these chemical reactions and the associated thermodynamic aspects are disclosed in document reference [5] at the end of the description.

Most SOFC type devices that exist in the world are complete devices (external reformer, post-combustion system, heat recovery, etc.), as described in document references [1] and [4], and intended for use under given stable operating conditions. There are several small demonstrators operating on natural gas or propane in the world as described in document reference [3], developed essentially for military use. Thus the Acumentrics company, as described in document reference [2], markets systems between 150 W and 10 kW, capable of resisting fast temperature increase/decrease cycles due to a tubular technology. As described in document reference [3], the Ultra Electronics AMI company is developing systems of a few hundred Watts for military and civil applications.

But devices according to prior art suffer from many weaknesses, the most important of which are:
- demonstrators, or SOFC devices marketed throughout the world frequently require long temperature increase and decrease times, making it difficult to quickly demonstrate their operating principle, for example for teaching purposes,
- proposed SOFC devices are often complex and expensive, and require special know how to get them to function,
- fast thermal cycles usually cause breakage of the electrochemical cells, since the coefficient of thermal expansion of electrochemical cells is less than that of some types of metallic interconnectors by a factor of 2 ($10 \times 10^{-6} K^{-1}$ for cells and $20 \times 10^{-6} K^{-1}$ for some high temperature metallic alloys),
- transformation of the gas used (methane or propane) is often necessary before inlet to the cell, which makes the device more complex.

The purpose of the invention is an electrochemical electricity generating device of the solid-oxide fuel-cell (SOFC) type capable of overcoming these disadvantages of devices known in prior art.

PRESENTATION OF THE INVENTION

The invention relates to an electrochemical electricity generating device of the solid-oxide fuel-cell type, characterised in that it comprises a planar assembly consisting of at least one electrochemical cell located between first and second gas diffusing plates made of a ceramic material with a coefficient of expansion between $8 \times 10^{-6}$ $K^{-1}$ and $14 \times 10^{-6}$ $K^{-1}$ and in which equidistant holes are formed; first and second electricity collection metal grids each connected to a conducting wire allowing current to flow outside the device, being located on each side of said at least one cell between this cell and each of the first and second gas diffusion plates; and clamping means mechanically holding this planar assembly.

Advantageously, the gas diffusion plates are curved at their ends so as to embed the at least one electrochemical cell. The device also comprises a first and a second heat conducting element, for example metal plates in which holes are formed on each side of the first and second gas diffusion pates to surround them.

Advantageously, holes are formed in each gas diffusion plate with a diameter of between 4 and 6 mm, the centres of two adjacent holes being located at a distance of 8 to 12 mm from each other. The thickness of each gas diffusion plate is between 3 and 10 mm. Each gas diffusion plate is made from one of the following materials: alumina, zirconia or a material known as "macor" (registered trademark). Advantageously, the electrical conductivity of the electricity collection grids is higher than 100 S/m at 60° C. For example, they may be made from one of the following materials: nickel, platinum or gold. Advantageously, the clamping means clamp such that the clamping pressure on the at least one electrochemical cell is between 200 g/cm$^2$ and 1000 g/cm$^2$. This optimum clamping assures satisfactory electrical contact while limiting risks of degradation of the electrochemical cell when the temperature increases.

The invention has many advantages, and particularly the following:

The invention allows a fast demonstration of the principal of an SOFC type fuel cell supplied with natural gas, for teaching purposes. The temperature rise between ambient temperature and 700° C. takes about 5 minutes, in comparison with several hours for a conventional system.

The invention enables a non-destructive test of the electrochemical cell, since the gas diffusion plates are designed so that thermal cycles with the invention are possible for several tens of cycles with causing any damage.

The invention can generate a voltage of between 0.7 V and several volts (typically 5 V depending on the number of cells electrically in series), to supply power to different electrical devices. Power of the order of about ten watts is then available, that can vary depending on the quality and the surface area of the electrochemical cells.

The invention can be used to recharge electronic equipments using a gas heater, while retaining the advantage of this gas heater for a different parallel application (for example cooking during onboard use).

Problems with contacts and resistive losses between the electrochemical cell and the collection grids can also be studied using this invention. The clamping force necessary to obtain a satisfactory electrical contact can be optimised by performing tests at high temperature, made possible by a fast temperature increase, which saves money and time.

The invention is easy to implement and is inexpensive to make and to use, compared with conventional SOFC demonstration devices, making the invention very attractive for teaching purposes but also as a commercial on board gas generator of electricity.

DETAILED PRESENTATION OF PARTICULAR EMBODIMENTS

Figure 1:
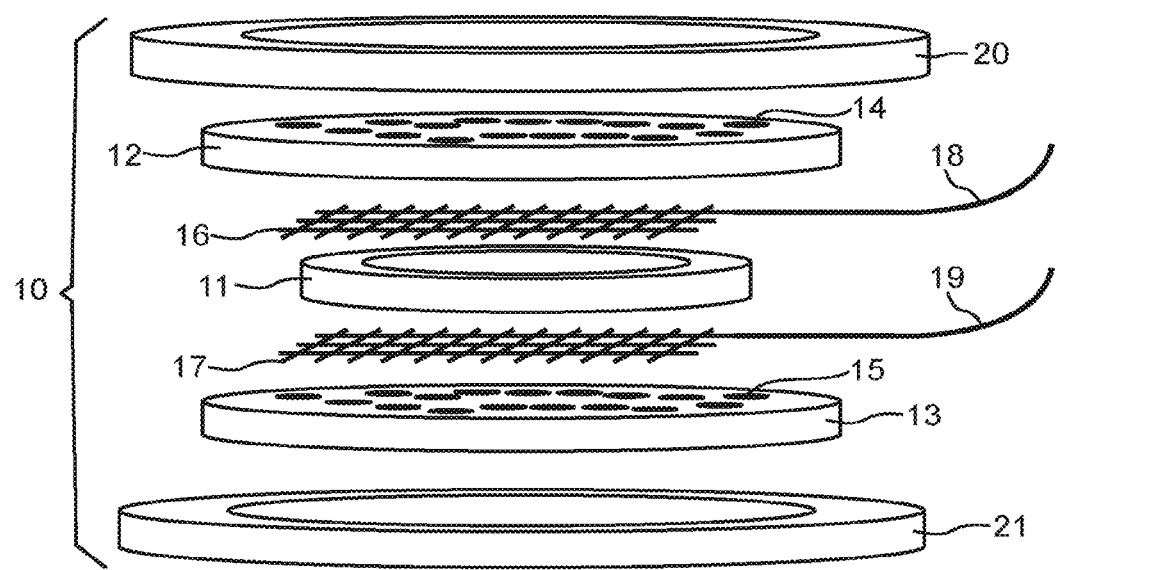
FIG. 1 illustrates an exploded view of the device according to the invention.

As illustrated on FIG. 1, the electricity generating electrochemical device of the solid-oxide fuel-cell type comprises a planar assembly 10 consisting of at least one electrochemical cell 11 between first and second gas diffusion plates 12 and 13 made of a ceramic material with a coefficient of expansion between $8 \times 10^{-6}$ $K^{-1}$ and $12 \times 10^{-6}$ $K^{-1}$ in which equidistant holes 14 and 15 are formed; first and second electricity collection metal grids 16 and 17 each connected to a conducting wire 18 and 19 allowing current to flow outside the device, said grids being located on each side of said at least one cell, between this cell and each of the first and second gas diffusion plates, and clamping means; for example making use of round plates 20 and 21 in which holes have been formed and sets of threaded rods 32 and 33 holding this assembly together mechanically.

In the advantageous example embodiment, the device according to the invention has the following characteristics.

The gas diffusion plates 12 and 13 are composed of:
electronic insulating materials,
for which the coefficient of thermal expansion is between $8 \times 10^{-6}$ and $14 \times 10^{-6}$ $K^{-1}$,
between 3 and 10 mm thick,
in which 4 to 6 mm diameter holes have been formed with equidistant centres at a spacing of 8 to 12 mm over an area equal to the area of the electrochemical cell(s) used.

They can advantageously be made from one of the following materials: alumina, zirconia or a material known under the name of "macor" (registered trademark).

The electricity collection grids 16 and 17 have the following characteristics:
they have an electrical conductivity of more than 100 S/cm at 600° C.,
they resist a temperature of 800° C.,
they comprise between 10 and 5000 mesh cells/cm$^2$.

They can advantageously be made from one of the following materials: nickel, platinum or gold.

Figure 2:
FIG. 2 illustrates an example of an electrochemical cell with three layers.

The electrochemical cell 11 illustrated on FIG. 2 is located on the current collection grid 17 placed on the lower gas diffusion plate 13 (gas fuel side). This electrochemical cell 11 is composed of at least:
an electrolyte 25 leaktight for hydrogen, with a high ion conductivity (more than 0.01 S/cm at 700° C.), a negligible number of electron transports in the interval of partial oxygen pressures fixed by the fuel and the oxidant ($10^{-20}$ at 0.2 atm), good physical impermeability to gases, and a coefficient of thermal expansion equal to between $9 \times 10^{-6}$ and $12 \times 10^{-6}$ $K^{-1}$, a porous cathode material 26, electronic conductor at the working temperature (electronic conductivity more than 50 S/cm), capable of catalysing the oxygen reduction reaction, stable in an oxidising atmosphere, a porous anode material 27, electronic conductor at the working temperature (electronic conductivity more than 50 S/cm), capable of catalysing the hydrogen oxidation reaction, stable in a reducing atmosphere, Additional layers (the number of layers can be up to 10) can be added to improve the performances of the electrochemical cell 11.

The electrochemical cell 11 can indifferently be held in place mechanically by one of the layers, which in this case must be thick (thickness more than 80 μm).

The collecting grid on the air side 16 is then put into place, and the upper gas diffusion plate 12 is then installed. The two plates 12 and 13 are then clamped using clamping means 20, 21, 32 and 33, to mechanically retain the assembly 10, and provide efficient current collection through grids 16 and 17 (FIG. 1). Each of the grids 16 and 17 is connected to a conducting wire through which current flows to outside the device. The material from which these wires 18 and 19 are formed must:

be electronically conducting (more than 100 S/cm),
resist high temperatures (700° C.),
keep its electronic conductivity properties in reducing and oxidising atmospheres, up to 700° C.

Clamping must correspond to a pressure on the cell equal to 200 to 1000 g/cm². This optimum clamping assures satisfactory electrical contact while limiting risks of degradation of the electrochemical cell 11 when the temperature increases.

The device according to the invention can thus form a rectangular parallelepiped about 20 cm long and wide and 3 cm high.

Figure 3:
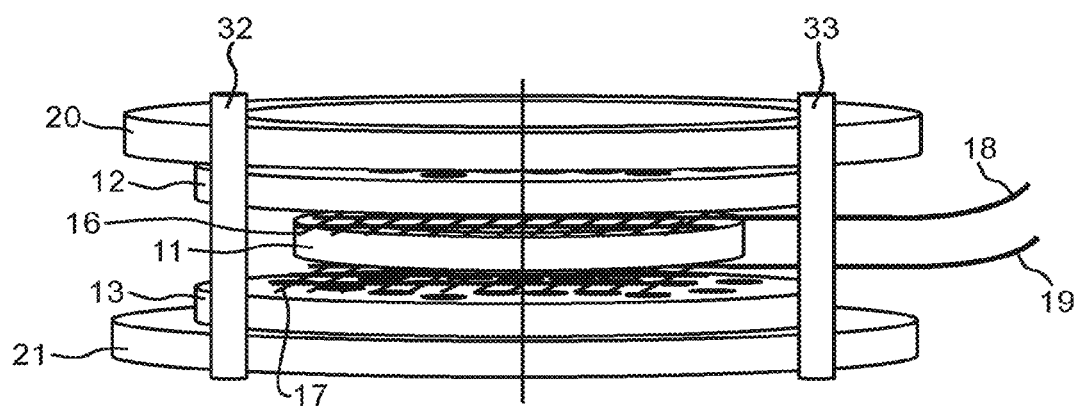
FIG. 3 illustrates the device according to the invention in use.

In one example embodiment illustrated on FIG. 3, the device according to the invention is positioned above a gas heater 30, for example a camping stove, the distance between the flame and the lower gas diffusion plate 13 advantageously being between 8 mm and 15 mm, in a zone in which the temperature and partial oxidation of methane are controlled, so that the temperature of the electronic cell can be reached and hydrogen can be supplied to it. The electrode in air is supplied with oxygen from the air. There are thus the following two reactions:

First electrochemical reaction: 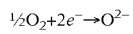
$\frac{1}{2}O_2 + 2e^- \rightarrow O^{2-}$ $H_2 + O^{2-} \rightarrow H_2O + 2e^-$ 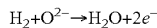

Second electrochemical reaction: 
$aCH_4 + bO_2 \rightarrow cH_2 + dCO + eH_2O + fCO_2 + \text{heat}$ A zone of this type and the nature of the gas diffusion plates 12 and 13 are optimised so that part of the gas is fully oxidised (combustion complete) and adds the necessary heat so that the temperature of the electrochemical cell 11 is of the order of 600 to 700° C. In this temperature range, the ion conduction of the thin electrolyte in the electrochemical cell is sufficient for the cell to be efficient. A zone of this type and the nature of the diffusion plates also make it possible that part of the gas is only partially oxidised. An $H_2+CO$ mix is then formed and this gas mix is a fuel for the electrochemical cell 11. The use of ceramic gas diffusion plates 12 and 13 makes it possible to accommodate mechanical stresses related to temperature gradients, and the electrochemical cell 11 can thus be heated to an ambient temperature of 600 of even 700° C. in a few minutes. Once the electrochemical cell 11 has reached the required temperature, it is possible for a current to circulate as a result of the electrochemical reactions to oxidise hydrogen and reduce oxygen in the air that can take place on each side of the electrochemical cell 11, and a voltage of about 0.8 V per cell appears at the terminals of the device. Several bulbs can then be powered, but any other device (motor, battery etc.) could also be powered by the invention described. Means of electrochemical characterisation can also be connected in order to make more precise measurements on the connected cells.

Figure 4:
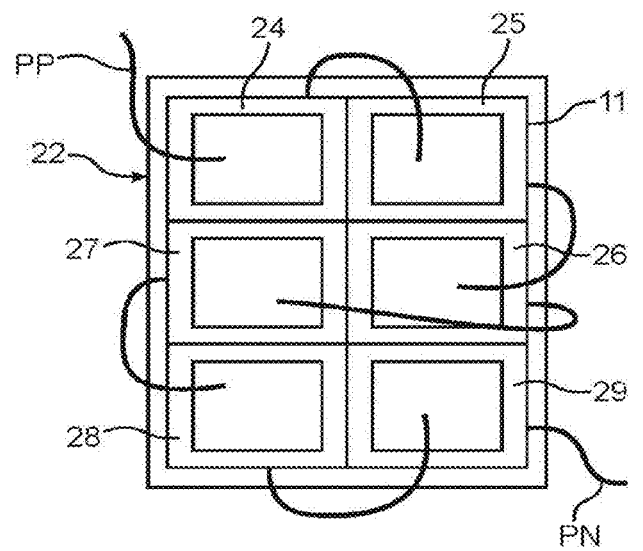
FIGS. 4 and 5 illustrate two variant embodiments of the invention.

The voltage at the terminals of the device can then be increased, and adjusted if necessary, by connecting cells 24 to 29 in series with each other on a ceramic support 22 (between a positive pole PP and a negative pole PN, as shown for example on FIG. 4). A voltage of 5 V can then be obtained, compatible for example with some devices that can be recharged on a USB port.

Figure 5:
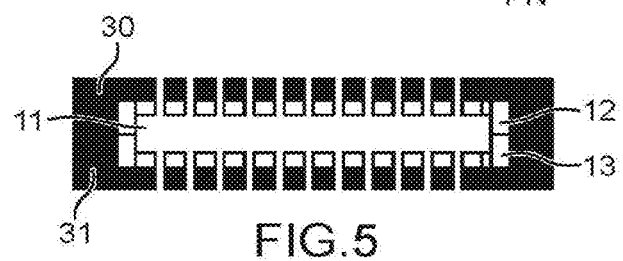

As illustrated on FIG. 5, a sufficient pseudo-seal can be obtained by embedding the cells 24 in shapes corresponding to the geometry of the cells in the lower diffusion plate 13. Complete combustion of methane (related to a gas short circuit around the periphery of the cells) is then sufficiently prevented so that the electrochemical cell 11 can function.

As illustrated on FIG. 5, the gas diffusion plates 12 and 13 are curved at their ends so as to surround the at least one electrochemical cell 11. The device according to the invention then comprises first and second heat conducting elements 30, 31, such as metal plates in which holes are formed, located on each side of the first and second gas diffusion plates 12 and 13 to surround them, to make use of heat output by a heater by redistributing this heat in the upper part of the device according to the invention. The holes in the gas diffusion plates 12 and 13 correspond to the holes in the metal plates 30 and 31. By conduction, the metal plates 30, 31 form the junction between the lower part and the upper part of the device according to the invention, so that an object placed on the upper part can be heated.

Example Embodiment

Figure 6:
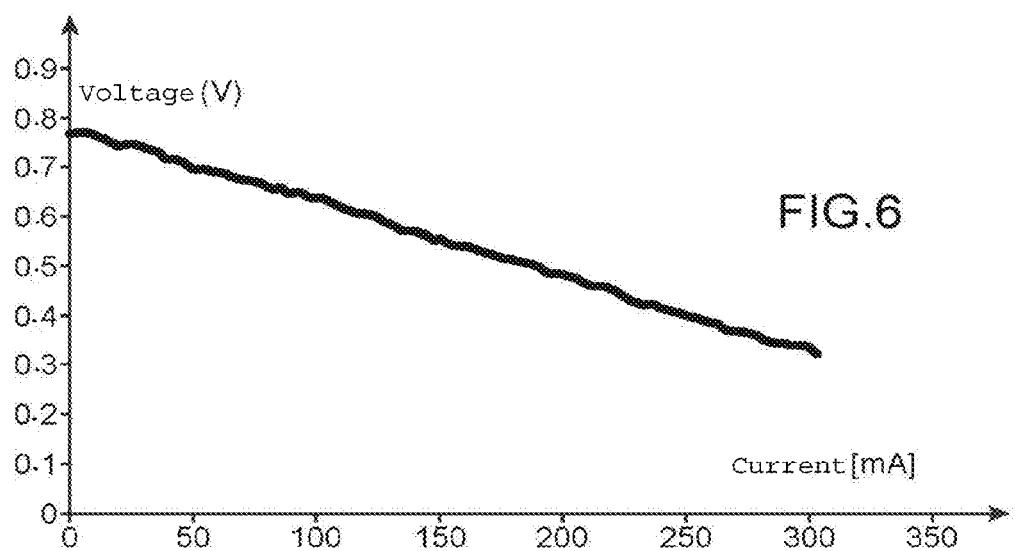
FIG. 6 shows a voltage as a function of current curve obtained with one advantageous embodiment.

The following elements are used in one advantageous example embodiment:

For the gas diffusion plates 12 and 13:
material used: material known as "MACOR" (registered trademark),
distance between holes 9 mm,
hole diameter 5 mm,
thickness: 6.5 mm, For the current collection plates 16 and 17:
material: platinum,
grid: 3600 mesh cells/cm², For the electrochemical cell 11:
cell with 500 μm thick anode (support anode) made of material Ni/8YSZ,
8 μm thick 8YSZ electrolyte,
25 μm thick LaSrCoFeO₃ air electrode, For the conducting wires 18 and 19 used:
material: platinum,
wire diameter: 1 mm Such an embodiment can supply power for satisfactory operation of several bulbs. A polarisation curve (current/voltage) can be made to characterise the electrochemical performances of the invention more precisely. A current density of about 300 mA/cm² is thus obtained at 0.3 V, as illustrated on FIG. 6. 10 thermal cycles are made between ambient temperature and the working temperature, without degrading the electrochemical performances of the electrochemical cell.

REFERENCES

[1] "Fifteen years of SOFC development in Australia" by K. Föger and J. G. Love ("Solid state ionics", pages 119-116, 2004),
[2] "Thermochemical model and experimental validation of a tabular SOFC cell comprised in a 1 kW stack designed for μCHP applications" by Carlos Boigues-Munoz, Giulio Santori, Stephen McPhail and Fabio Polonara (International Journal of hydrogen energy 39, pages 21714-21723, Oct. 7, 2014),
[3] "Microtubular SOFC anode optimization for direct use on methane" by A. Dhir and K. Kendall (Journal of Power sources, 2008, pages 297-303),
[4] "The cost of domestic fuel cell micro-CHP systems" by Iain Staffel and Richard Green (International Journal of hydrogen energy 38, 2013, pages 1088-1102)
[5] "Hydrogen production by coupled catalytic partial oxidation and steam methane reforming at elevated pressure and temperature" by Luwei Chen, Qi Hong, Jianyi Lin and F. M. Dautzenberg (Journal of Power Sources. 164, 2007, pages 803-808).

The invention claimed is:

1. An electricity generating electrochemical device of a solid-oxide fuel-cell type, comprising:
a planar assembly; and
a clamp configured to mechanically hold the planar assembly,
wherein the planar assembly includes:
first and second gas diffusion plates made of a ceramic material with a coefficient of expansion between $8 \times 10^{-6}$ K$^{-1}$ and $14 \times 10^{-6}$ K$^{-1}$ and in which holes are formed, each hole being equidistant from an adjacent hole, the holes formed in the first and second gas diffusion plates are configured to allow gas diffusion; and
at least one electrochemical cell in between the first and second gas diffusion plate, the holes formed in the first and second gas diffusion plates are formed in an area equal to an area of the electrochemical cell;
first and second current collection metal grids each connected to a conducting wire allowing current to flow outside the device, said first and second current collection metal grids being located on each side of said at least one electrochemical cell between this cell and each of the first and second gas diffusion plates.

2. The device according to claim 1, wherein the first and second gas diffusion plates are curved at their ends so as to embed the at least one electrochemical cell.

3. The device according to claim 2, further comprising a first and a second heat conducting element arranged on each side of the first and second gas diffusion pates to surround them.

4. The device according to claim 3, in which the first and second heat conducting elements are metal plates in which holes are formed.

5. The device according to claim 1, wherein the holes formed in the first and second gas diffusion plates with a diameter of between 4 and 6 mm, the centers of two adjacent holes being located at a distance of 8 to 12 mm from each other.

6. The device according to claim 1, wherein a thickness of each one of the first and second gas diffusion plate is between 3 and 10 mm.

7. The device according to claim 1, wherein each one of the first and second gas diffusion plates is made from a material including at least alumina or zirconia.

8. The device according to claim 1, wherein an electrical conductivity of the first and second current collection metal grids is higher than 100 S/m at 60° C.

9. The device according to claim 1, wherein the first and second current collection metal grids are made from one of the following materials: nickel, platinum or gold.

10. The device according to claim 1, in which the clamp clamps such that a clamping pressure on the at least one electrochemical cell is between 200 g/cm$^2$ and 1000 g/cm$^2$.

11. The device according to claim 1, wherein the clamp includes two plates disposed at either side of the planar assembly and two or more threaded rods configured to hold the two plates together.

12. The device according to claim 11, wherein a diameter of the two plates of the clamp is larger than a diameter of the planar assembly, and the two or more threaded rods are disposed at edges of the two plates of the clamp and outside a circumference of the planar assembly.

* * * * *